May 19, 1931.  B. L. CUMMINGS ET AL  1,806,540
COUPLING DEVICE
Filed April 22, 1925   2 Sheets-Sheet 2

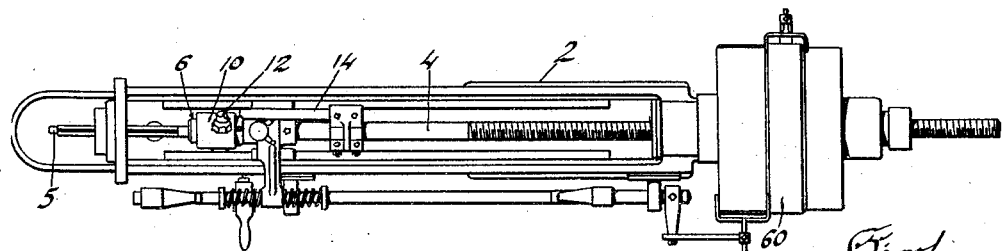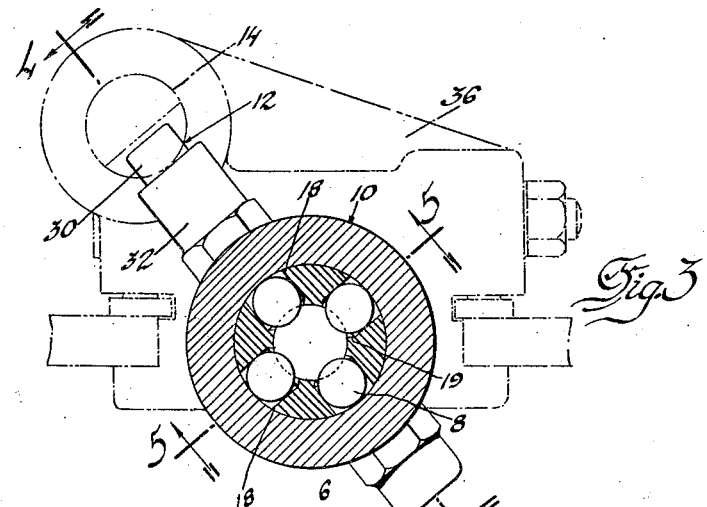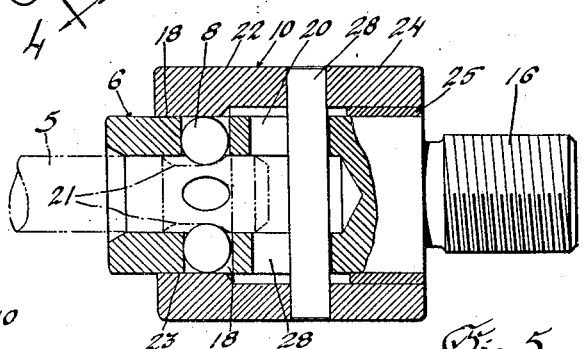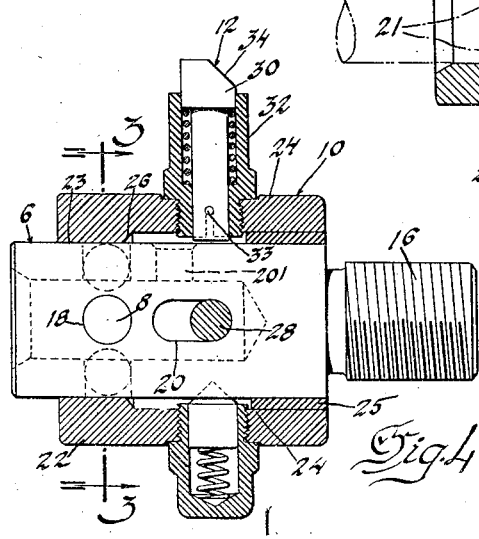

Inventor
Benjamin L. Cummings
& Arthur W. Harris
Blackmore, Spence & Phil.
Attorney Patented May 19, 1931

1,806,540

UNITED STATES PATENT OFFICE

BENJAMIN L. CUMMINGS AND ARTHUR W. HARRIS, OF TOLEDO, OHIO, ASSIGNORS TO GENERAL MOTORS CORPORATION, OF DETROIT, MICHIGAN, A CORPORATION OF DELAWARE

COUPLING DEVICE

Application filed April 22, 1925. Serial No. 25,139.

This invention has to do with improvements in coupling devices. It is broadly the object of the invention to provide a coupling device whereby two parts may be automatically and positively coupled upon assembly, and preferably of such construction that they will be automatically uncoupled under predetermined conditions.

We have devised the particular construction here shown to meet specific needs in the art of broaching machines but it is to be understood that the utility of our device is not limited thereto. Heretofore in the operation of these machines after the small end of the broach had been inserted through the opening in the gear or other part which is to be cut, the broach was coupled to the reciprocating shaft of the machine, usually by means of a pin-and-slot connection, whereupon it was pulled through the part to make the cut. When this was completed the part was slid off the broach and the latter was released from the reciprocating shaft by removing the holding pin. The broach was then ready for insertion in another part for a repetition of the above described operation.

We have devised our improved coupling means with the object of reducing the number of movements required of the operator by the prior practice just described. This coupling means is so arranged as to automatically lock the broach in position upon being operatively assembled with the end of the reciprocating shaft thus avoiding the necessity for manual coupling. We have also provided a trip to automatically release the connection of the broach with the shaft at the end of the cutting stroke thus eliminating another manual operation.

We have also constructed our improved coupling device of very few parts, and have so fashioned these parts as to be practically free from wear.

In the drawings we have shown one embodiment which our invention may assume but it is to be understood that the principles thereof are capable of use in many other relations.

Figure 1 is a top plan view of a broaching machine showing our coupling device applied thereto, while

Figure 3 is a section on line 3—3 of Figure 4, the trip actuator being shown in operative position in dotted lines;

Figure 4 is a section on line 4—4 of Figure 3;

Figure 5 is a section on line 5—5 of Figure 3;

Figure 2:
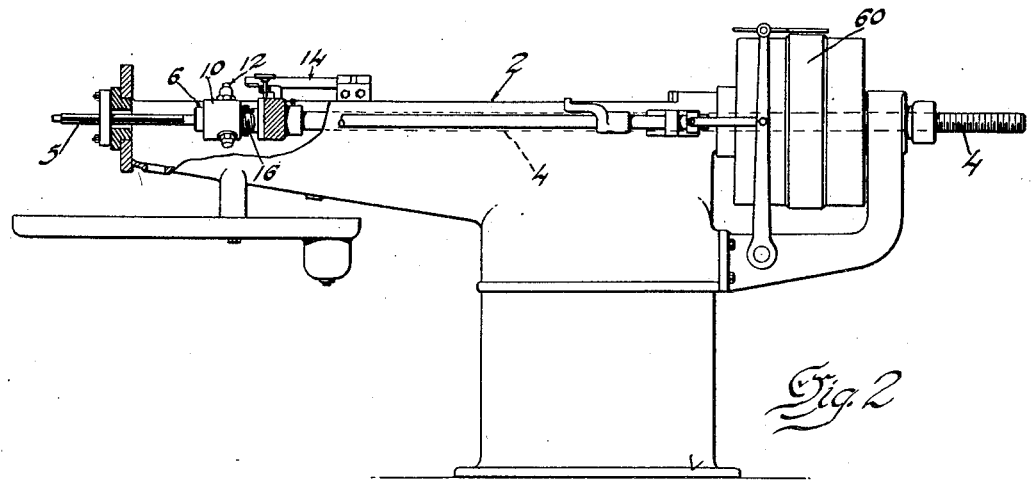
Figure 2 is a side elevation thereof.

Referring now to the drawings, reference character 2 indicates generally a broaching machine of any preferred type to which we have shown our invention applied. The specific construction of the machine itself forms no part of our invention. It consists essentially of a driving member consisting of a shaft 4 provided with worm threads for engagement with similar internal threads formed upon drive pulleys 60 or parts operatively connected therewith. The shaft 4 is held against rotation so that it receives a simple reciprocating motion. Any suitable form of mechanism may be provided for reversing the direction of movement of the shaft 4 at the end of its strokes. The broach shown at 5 is first inserted through the article to be worked and is then connected to the shaft 4 which pulls it through the article making the desired cut.

Our invention resides in the device for coupling the broach to the shaft and provides for automatic coupling and uncoupling of these parts. It consists essentially of a tool receiving means 6, a keying means consisting of antifriction devices 8 adapted to lock the tool to the tool receiving means, and means numbered 10 for moving said antifriction devices into keying position and for releasing them from keying position, and a trip device associated with the last named means, and consisting of a trip 12 and a trip actuator 14, for rendering the keying means ineffective at the end of the working stroke.

The tool receiving means 6 is shown on the drawing as in the form of a socket adapted to be secured upon the end of a shaft 4 in any desired manner. We have shown the member 6 provided with threads 16 for this purpose. Near the open end the cylindrical wall of the socket is pierced by a number of circumferentially spaced radial openings 18. These openings constitute guide means for the antifriction members 8, and are preferably formed at their inner ends with shoulder portions 19 shown in Figure 3, to prevent the antifriction devices 8 from dropping out of the openings when the broach is removed from the socket. Farther removed from the open end the wall of the socket is provided with two alined axially elongated openings 20 and, spaced circumferentially from the last named openings, with an opening or socket 201 for purposes to be later described.

As before stated the keying means comprises antifriction members or balls 8 which are received in the openings 18 in the member 6 and are adapted to engage depressions 21 provided in the end of the broach. It will now be seen that if these balls, after seating in the depressions 21, are prevented from radial movement the tool will be held locked in the tool receiving means. To move the balls to keying or seating position and to hold them in such position I have provided the means previously referred to by the reference character 10. This means consists of a sleeve 22 one end of which is bored out as at 23 to a diameter to snugly fit the socket 6 while the remainder 24 is bored out to a larger diameter. To afford a better bearing between the members 6 and 22 a bushing 25 is fitted within the end of the portion 24 and engages the socket 6. Between the portion 23 and the portion 24 is arranged a cam device consisting of an inclined plane 26.

It will now be apparent that the position of the sleeve 10 determines whether or not the balls 8 are held in keying or non-keying position, for if the sleeve 22 be adjusted so that the part 23 bears against the balls the latter are held in the depressions 21 in the broach and thus effectively lock the broach in the socket 6, while if the sleeve 22 be adjusted so that the part 24 is opposite the balls, the broach may be removed for the balls are free to move radially outward when a pull is applied to draw the broach from the socket. The inclined plane 26 serves to cam the balls 8 into locking position.

The structure so far described would be effective for manual coupling of the broach to the operating shaft but we have preferred to render its action automatic. This we have accomplished by the provision of a pin 28 seated in alined apertures in the member 22 and passing through the elongated slots 20 in the socket 6. Let us now assume that the member 22 has been slid as far to the left in Figure 5 as the slots 20 will permit, this being the normal position of the parts to permit of the removal of the broach. If now the broach be inserted in the socket 6 it will engage the bar 28, thus forcing the member 22 to the right as shown in Figure 5 and thereby thrusting the balls 8 radially inward into engagement with the depressions 21 in the broach thus automatically locking the parts against separation.

Figure 6:
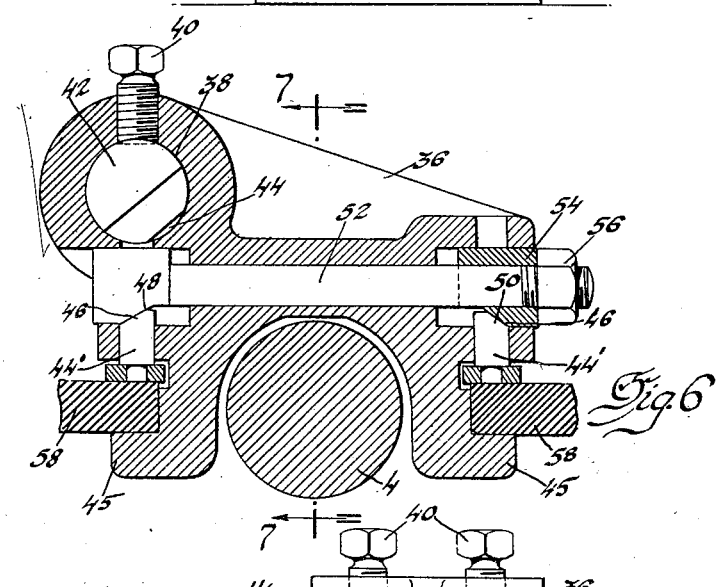
Figure 6 is a sectional view through the clamping means for our trip actuator.
Figure 7:
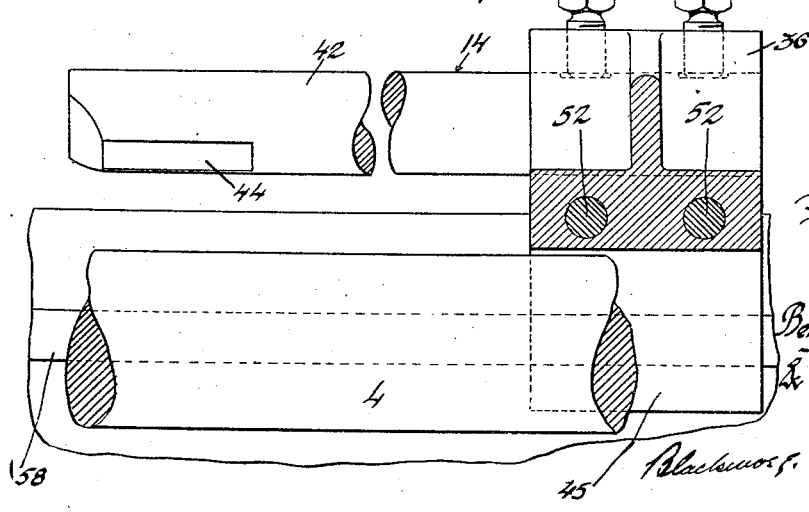
Figure 7 is a section on line 7—7 of Figure 6.

In conjunction with the structure so far described we have provided automatic means for releasing the broach from the shaft at the end of the cutting movement. This is the trip device previously referred to consisting of the trip 12 and the trip actuator 14. The trip 12 consists of a plunger 30 mounted in the guide 32 which is threaded into the member 10, the plunger and guide being keyed together against relative rotation as at 33. The plunger is provided with a beveled end 34. The trip actuator 14 cooperates with the plunger 30 and is shown in detail in Figures 3, 6, and 7. It consists of a supporting member 36 provided with a socket 38 in which is adjustably clamped as by means of set screws 40, a member 42 which is adapted for engagement with the beveled end 34 of the plunger 30. For this purpose its end is correspondingly beveled and is provided with an undercut portion 44 for purposes which will later be described.

The supporting member 36 is secured to the framework of the machine in any suitable manner. As shown it is formed to straddle the shaft 4 and is provided with shoulders 45 which engage beneath portions of the framework of the machine shown at 58 and serve, in connection with a clamping means, to hold the member 36 in position. We have preferred to use as best adapted to the requirements of my device a clamping means which comprises plungers 44' provided at one end with suitable wear resisting heads and at the other end with oppositely beveled portions 46 adapted to engage similar beveled portions 48 and 50 carried, respectively, by the head of bolt 52 and by a sleeve 54 slidably mounted on the bolt. A nut 56 with which the bolt is provided serves to give a wedging action which results in forcing plungers 44' downwardly thereby clamping the portions of the machine framework shown at 58 between the shoulders 45 and the plungers 44'.

We shall now describe the manner in which the automatic release of the broach is effected. With the broach locked in position as shown in Figure 5 and the trip actuator positioned as shown in Figures 1 and 2, at the end of the cutting stroke the beveled end 34 of the plunger 30 will engage the end of the member 42. Since the member 6, in this position of the parts, prevents the depression of the plunger, the sleeve 10 is consequently slid to the left as shown in Figure 4 effecting the release of the balls 8 from keying position. When this has been accomplished the inner end of the plunger 34 is opposite the socket 201 which it now enters, the shaft 4 continuing to the end of its stroke with the tip of the plunger 30 in engagement with the under-cut portion 44 of the member 42. It will be obvious that if the tool be grasped at the time the trip device begins to operate, the broach will not only be automatically unlocked but the socket 6 will be drawn away from it leaving it in the hand of the operator.

We claim:

1. The combination of a tool-receiving member, a tool, keying means associated with said member and said tool and adapted to positively lock them together, means operated by the act of assembling said tool with said tool receiving member for rendering said keying means operative, said second mentioned means comprising a sleeve surrounding the tool-receiving member and having means for operative engagement with the tool when assembled for shifting the sleeve to locking position, means for locking engagement with the keying means when the sleeve is shifted to locking position and trip means associated with and in part exterior to said sleeve and adapted to engage the latter during its norml course of movement to move it to inoperative position.

2. The combination of a tool receiving member, a tool, keying means associated with said member and said tool and adapted to positively lock them together, means operated by the act of assembling said tool with said tool receiving member for rendering said keying means operative, said second mentioned means comprising a sleeve surrounding the tool receiving member and having means for operative engagement with the tool when assembled for shifting the sleeve to locking position and means for locking engagement with the keying means, when the sleeve is shifted to locking position and trip means associated with and in part exterior to said sleeve and adapted to engage the latter during its normal course of movement to move it to inoperative position, said trip means comprising a trip and a trip actuator.

3. The combination of a tool receiving member, a tool, keying means associated with said member and said tool and adapted to positively lock said parts together, a shiftable sleeve surrounding said tool receiving member and adapted to hold said keying means in operative position, and relatively stationary trip means associated with said sleeve for shifting the latter for automatically rendering said keying means inoperative.

4. The combination of a tool receiving socket, a tool adapted to be received therein, antifriction means associated with said socket and with said tool for positively locking said parts together, and means surrounding said socket and operated by the insertion of the tool for moving said antifriction means to operative position, and relatively stationary trip means associated with said last named means for rendering said antifriction means inoperative.

5. A tool-receiving socket provided with guiding means, antifriction members received in said guiding means, a tool having a shank provided with depressions for receiving said antifriction members to lock said tool in said socket, a sleeve slidable on said socket and provided with portions of different diameters so that in one position of said sleeve said antifriction members are held in locking position and in another position of said sleeve said antifriction members are free, and trip means for moving said sleeve to inoperative position, said trip means comprising a spring pressed member on said sleeve having a cam portion thereon and a trip actuator adapted to engage said cam portion for sliding said sleeve to inoperative position.

6. The combination as set forth in claim 3, said trip means comprising a trip and a relatively stationary trip actuator, and said keying means comprising a holder and keying device mounted therein, said holder being recessed to receive said trip after the latter has been operated by said actuator for rendering said keying device inoperative.

7. A tool-receiving socket provided with guiding means, anti-friction members received in said guiding means, a tool having a shank provided with depressions for receiving said anti-friction members to positively lock said tool in said socket, a sleeve slidable on said socket and provided with portions of different diameters so that in one position of said sleeve said anti-friction members are held in locking position and in another position of said sleeve said anti-friction members are free, a projection on said sleeve entering said socket and adapted for direct engagement by said tool for moving said sleeve to locking position upon insertion of said tool in said socket and relatively stationary trip means for moving said sleeve to inoperative position.

In testimony whereof we affix our signatures.

BENJAMIN L. CUMMINGS.
ARTHUR W. HARRIS.